United States Patent
Guvenc

(10) Patent No.: US 8,340,038 B2
(45) Date of Patent: Dec. 25, 2012

(54) METHOD FOR TIME FREQUENCY SPREADING IN A FEMTOCELL NETWORK FOR INTERFERENCE REDUCTION

(75) Inventor: Ismail Guvenc, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 430 days.

(21) Appl. No.: 12/683,263

(22) Filed: Jan. 6, 2010

(65) Prior Publication Data
US 2010/0177722 A1 Jul. 15, 2010

Related U.S. Application Data

(60) Provisional application No. 61/143,708, filed on Jan. 9, 2009.

(51) Int. Cl.
| | |
|---|---|
| H04W 4/00 | (2009.01) |
| H04J 3/06 | (2006.01) |
| H04B 1/00 | (2006.01) |
| H04Q 7/20 | (2006.01) |

(52) U.S. Cl. ....... 370/329; 370/350; 455/63.1; 455/450; 455/522; 375/260

(58) Field of Classification Search .......... 370/329–350; 455/63.1–522; 375/148–260
See application file for complete search history.

(56) References Cited

U.S. PATENT DOCUMENTS

| | | | | |
|---|---|---|---|---|
| 2007/0058595 | A1* | 3/2007 | Classon et al. | 370/337 |
| 2007/0177658 | A1* | 8/2007 | Mehrabani et al. | 375/148 |
| 2007/0270152 | A1 | 11/2007 | Nylander et al. | |
| 2009/0219888 | A1* | 9/2009 | Chen et al. | 370/331 |

FOREIGN PATENT DOCUMENTS
WO 2008/140555 11/2008

OTHER PUBLICATIONS

Partho Choudhury and Deepak Dahuja, "UMA and Femtocells: Making FMC Happen", White Paper, Dec. 2007. [Online] Available: http://www.parthochoudhury.com/UMAFemto.doc.

Airvana Inc., "Femto Cells: Personal Base Stations", White Paper, 2007. [Online] Available: http://www.airvana.com/files/Femto_Overview_Whitepaper_FINAL_12-July-07.pdf.

PicoChip Designs Ltd., "The Case for Home Base Stations," White Paper, Apr. 2007. [Online] Available: http://www.picochip.com/downloads/27c85c984cd0d348edcffe7413f6ff79/femtocell_wp.pdf.

Vikram Chandrasekhar and Jeffrey G. Andrews, "Uplink Capacity and Interference Avoidance for Two-Tier Cellular Networks," in Proc. IEEE Global Telecommunications Conference (GLOBECOM), Washington, DC, pp. 3322-3326, Nov. 2007.

(Continued)

*Primary Examiner* — Afsar M. Qureshi
(74) *Attorney, Agent, or Firm* — Haynes and Boone, LLP

(57) ABSTRACT

A femtocell network uses idle resource blocks of a data frame to reduce interference by spreading the resource blocks of the users over the available spectrum. Spreading may be achieved by repeating the transmission using a number of the resource block groups. As a result, (a) more robustness is obtained against interference; (b) transmission power levels may be decreased because of the spreading, resulting in reducing interference between nearby femtocells and between a macrocell and a femtocell. Other methods of spreading such a frequency or time slot hopping may also be used.

35 Claims, 8 Drawing Sheets

OTHER PUBLICATIONS

Lester T. W. Ho and Holger Claussen, "Effects of User-Deployed, Co-Channel Femtocells on the Call Drop Probability in a Residential Scenario," in Proc. of IEEE Int. Symp. on Personal, Indoor and Mobile Radio Communications (PIMRC), Athens, Greece, pp. 1-5, Sep. 2007.

Holger Claussen, "Performance of Macro- and Co-Channel Femtocells in a Hierarchical Cell Structure," in Proc. of IEEE Int. Symp. on Personal, Indoor and Mobile Radio Communications (PIMRC), Athens, Greece, pp. 1-5, Sep. 2007.

3GPP, "3rd generation partnership project; technical specification group radio access networks; 3G Home NodeB study item technical report," Shangai, China, Mar. 2008, 3GPP TR 25.820 V8.0.0 (Mar. 2008). [Online]. Available: http://www.3gpp.org/flp/Specs/html-info/25820.htm.

Guang Han, "Support for Femtocell", Technical Contribution to IEEE 802.16m, Jul. 7, 2008. [Online]. Available: http://dot16.org/ul_archive/C80216m-08_642.ppt.

Orange, Telecom-Italia, T-Mobile, and Vodafone, "Requirements for LTE Home eNodeBs," 3GPP Document R4-070209, Lemesos, Cyprus, Mar. 2007.

Vodafone-Group, "Home eNodeB consideratiosn for LTE," 3GPP Document R4-070456, Sophia Antipolis, France, Apr. 2007.

Yuefeng Zhou, Karthik Sundaresan, Honghai Zhang, Nader Zein, Sampath Rangarajan, "Interference Mitigation by Initial Configuration for Femtocell Access Points in IEEE802.16m Network", Technical Contribution to IEEE 802.16m, Jul. 8, 2008. [Online]. Available: http://wirelessman.org/tgm/contrib/C80216m-08_605.ppt.

Yuefeng Zhou, Karthik Sundaresan, Honghai Zhang, Nader Zein, Sampath Rangarajan, "Dynamic Interference Mitigation for Femtocell Access Points in IEEE802.16m Network", Technical Contribution to IEEE 802.16m, Jul. 8, 2008. [Online]. Available: http://wirelessman.org/tgm/contrib/C80216m-08_607.ppt.

Luciano Sarperi, Yanling Lu, "Interference Mitigation for Closed User Group Femtocells", Technical Contribution to IEEE 802.16m, Oct. 31, 2008. [Online]. Available: http://wirelessman.org/tgm/contrib/C80216m-08_1315.doc.

Motoki Morita, Nader Zein, Jun Zhou, Linghang Fan, Tetsu Ikeda, "Femtocell Interference Mitigation by Autonomously Adjusting Radio Resource Parameters", Technical Contribution to IEEE 802.16m, Oct. 31, 2008. [Online]. Available: http://wirelessman.org/tgm/contrib/C80216m-08_1254.pdf.

Whai-En Chen, Shiann-Tsong Sheu, Chih-Cheng Yang, Kanchei (Ken) Loa, Yung-Ting Lee, Chiu-Wen Chen, Chun-Yen Hsu, Youn-Tai Lee, Yi-Hsueh Tsai, Tsung-Yu Tsai, Chih-Shin Lin, Yang-Han Lee, Yih Guang Jan, "Interference Mitigation by Location-based Channel Allocation for Femtocell", Technical Contribution to IEEE 802.16m, Oct. 31, 2008. [Online]. Available: http://wirelessman.org/tgm/contrib/C80216m-08_1319.ppt.

Kaibin Zhang, Gang Shen, Jimin Liu, "Interference mitigation in Femtocells", Technical Contribution to IEEE 802.16m, Oct. 31, 2008. [Online]. Available: http://wirelessman.org/tgm/contrib/C80216m-08_1427.ppt.

Mamadou Kone, Ming-Hung Tao, Ying-Chuan Hsiao, Richard Li, "Self-coordinated femtocells to mitigate interference in IEEE 802.16m", Technical Contribution to IEEE 802.16m, Nov. 6, 2008. [Online]. Available: http://wirelessman.org/tgm/contrib/C80216m-08_1421r1.ppt.

S. V. Maric and E. L. Titlebaum, "Frequency hop multiple access codes based upon the theory of cubic congruences," IEEE Trans. Aerospace Electron. Syst., vol. 26, No. 6, pp. 1035-1039, Nov. 1990.

O. Moreno and S. V. Maric, "A new family of frequency-hop codes," IEEE Trans. Commun., vol. 48, No. 8, pp. 1241-1244, Aug. 2000.

S. V. Maric and E. L. Titlebaum, "A class of frequency hop codes with nearly ideal characteristics for use in multiple-access spread-spectrum communications and radar and sonar systems," IEEE Trans. Commun., vol. 40, No. 9, pp. 1442-1447, Sep. 1992.

M.S. Alouini, Sang Wu Kim, A. Goldsmith, "RAKE reception with maximal-ratio and equal-gain combining for DS-CDMA systems in Nakagami fading", in Proc. IEEE Int. Conf. on Universal Personal Commun., vol. 2, pp. 708-712, Oct. 1997.

PCT International Search Report for International Application No. PCT/US2010/020365 dated Mar. 15, 2010, 2 pages.

PCT Written Opinion of the International Searching Authority for International Application No. PCT/US2010/020365 dated Mar. 15, 2010, 4 pages.

* cited by examiner

METHOD FOR TIME FREQUENCY SPREADING IN A FEMTOCELL NETWORK FOR INTERFERENCE REDUCTION

CROSS REFERENCE TO RELATED APPLICATIONS

The present application is related to and claims priority of U.S. provisional patent application ("Provisional application"), entitled "Method for Time/Frequency Spreading in a Femtocell Network for Interference Reduction," Ser. No. 61/143,708, filed on Jan. 9, 2009. The disclosure of the Provisional Applicant is hereby incorporated by reference in its entirety. The present invention is also related to U.S. patent application ("Copending application"), Ser. No. 12/333,138, entitled "OFDMA-Based Co-channel Femtocell," filed on Dec. 11, 2008. The disclosure of the Copending application is also hereby incorporated by reference in its entirety.

BACKGROUND OF THE INVENTION

1. Field of the Invention

The present invention relates to wireless communications technology. More specifically, the present invention provides a system that reduces interference between a macrocell and a femtocell, and between neighboring femtocells.

2. Discussion of the Related Art

Recently, a new class of base stations which are designed for indoor and personal uses is discussed in (a) an article "UMA and Femtocells: Making FMC Happen", by Partho Choudhury and Deepak Dahuja published as a white paper, December 2007; (b) "Femto Cells: Personal Base Stations," published as a white paper from Airvana Inc., 2007, available on-line at http://www.airvana.com/files/Femto_Overview_Whitepaper_FINAL_12-July-07.pdf; and (c) the article "The Case for Home Base Stations," published as a white paper from PicoChip Designs Ltd., April 2007, available on-line at: http://www.picochip.com/downloads/27c85c984cd0d348edcffe7413f6ff79/femtocell_wp.pdf. As described in these publications, the cells serviced by these personal base stations are referred to as "femtocells;" these femtocells provide indoor connectivity through existing broadband Internet connections. Femtocells are also considered as an option for fixed-mobile convergence (FMC), which enables subscribers to switch an active data call session between a fixed wireless network (e.g., a wireless local area network (WLAN)) and a mobile network (e.g., a cellular network). The benefits of a femtocell include (a) improved indoor coverage, (b) reduced capital and operational expenditure, (c) reduced bandwidth load, (d) reduced power requirements, (e) additional high-end revenue streams, (f) improved customer royalty, (g) increase in the average revenue per user, (h) compatibility with existing handsets, and no requirement of dual-mode terminals, (i) deployment in operator-owned spectrum, and (j) enhanced emergency services (since the femtocell possesses knowledge of its location).

As far as physical layer transmission is concerned, prior art femtocells are most often designed for code division multiple access (CDMA) systems and $3^{rd}$ Generation (3G) technologies. Such systems are disclosed, for example, in the articles (a) "Uplink Capacity and Interference Avoidance for Two-Tier Cellular Networks" ("Chandrasekhar"), by Vikram Chandrasekhar and Jeffrey G. Andrews, published in Proc. IEEE Global Telecommunications Conference (GLOBE-COM), Washington, D.C., pp. 3322-3326, November 2007; (b) "Effects of User-Deployed, Co-Channel Femtocells on the Call Drop Probability in a Residential Scenario" ("Ho"), by Lester T. W. Ho and Holger Claussen, published in Proc. of IEEE Int. Symp. on Personal, Indoor and Mobile Radio Communications (PIMRC), Athens, Greece, pp. 1-5, September 2007; and (c) "Performance of Macro- and Co-Channel Femtocells in a Hierarchical Cell Structure" ("Claussen"), by Holger Claussen, published in Proc. of IEEE Int. Symp. on Personal, Indoor and Mobile Radio Communications (PIMRC), Athens, Greece, pp. 1-5, September 2007.

Chandrasekhar derives and analyzes the uplink (UL) capacity of a femtocell network coexisting with a macrocell network (i.e., a shared-spectrum network). In a split spectrum network, the femtocell users and the macrocell users are assigned orthogonal sub-channels. While orthogonal sub-channels avoid interference between the macrocell and the different femtocells, such a scheme decreases the number of users that can be supported. On the other hand, for a shared spectrum network, a femtocell may utilize some sub-channels that are already used by the macrocell, whenever there is little or diminished interference between the two networks. To reduce outage probability, Chandrasekhar proposes using interference avoidance methods. Specifically, the macrocell users and the femtocell users use time-hopping to decrease interference. Furthermore, both the macrocell and the femtocell use sectored antenna reception to increase capacity. Analytical and simulation results show that, through interference avoidance (e.g., time-hopped CDMA and sectorized antennas), up to seven times higher femtocell base station (fBS) density can be supported in a split spectrum network with omnidirectional femtocell antennas. Even though Chandrasekhar suggests time-hopping to reduce outage probability, Chandrasekhar's system is designed specifically for a CDMA-based communication system, which does not use frequency-hopping. Chandrasekhar also does not specify the spreading that is possible, which changes depending on the number of users and their data rates. In orthogonal frequency division multiple access (OFDMA)-based signaling, effective spreading conditions are still not well understood.

Ho analyzed handover probabilities for different power configurations at a femtocell. As manual cell planning used in macrocell networks is not practical for femtocells (i.e., not cost-effective), femtocells typically require auto-configuration capabilities, such as femtocell power and cell size auto-configuration. Using simulations, Ho shows that, in a residential co-channel femtocell deployment, call drop probabilities can be significantly decreased through simple pilot power adaptation mechanisms.

Claussen discloses a simple power control algorithm for pilots and data in a femtocell. Claussen's simulation results show that the interference to the macrocell network can be minimized through such a power control algorithm.

Femtocells have also become popular within standardization groups. For example, the 3GPP standard conducted an extensive study of CDMA-based femtocells. Their results are published in the technical report, entitled "3rd generation partnership project; technical specification group radio access networks; 3G Home NodeB study item technical report," Shanghai, China, March 2008, 3GPP TR 25.820 V8.0.0 (2008-03), available on-line at: http://www.3gpp.org/ftp/Specs/html-info/25820.htm. The standardization of femtocell-based OFDMA technology became more active in the second half of 2008. One example of such effort is the IEEE 802.16m standard (enhancement to the Mobile WiMAX standard), published as "Support for Femtocell," by Guang Han, Technical Contribution to IEEE 802.16m, Jul. 7, 2008. Other examples are the Long Term Evolution (LTE)-Advanced standard. See, for example, the studies (a) "Requirements for LTE Home eNodeBs," published by Orange, Telecom-Italia, T-Mobile, and Vodafone, 3GPP Document R4-070209, Lemesos, Cyprus, March 2007; and (b) "Home eNodeB considerations for LTE," published by Vodafone-Group, 3GPP Document R4-070456, Sophia Antipolis, France, April 2007. These standard studies include femtocells as possible inclusion in the final versions of their respective standards. Notably, IEEE 802.16m received a larger number of contributions related to handling interference in femtocells. Such contributions include:

(a) "Interference Mitigation by Initial Configuration for Femtocell Access Points in IEEE802.16m Network" ("Y-Zhou I"), by Yuefeng Zhou, Karthik Sundaresan, Honghai Zhang, Nader Zein, and Sampath Rangarajan, Technical Contribution to IEEE 802.16m, Jul. 8, 2008, available on-line at: http://wirelessman.org/tgm/contrib/C80216m-08_605.ppt;

(b) "Dynamic Interference Mitigation for Femtocell Access Points in IEEE802.16m Network" ("Y-Thou II"), by Yuefeng Zhou, Karthik Sundaresan, Honghai Zhang, Nader Zein, and Sampath Rangarajan, Technical Contribution to IEEE 802.16m, Jul. 8, 2008, available on-line at: http://wirelessman.org/tgm/contrib/C80216m-08_607.ppt;

(c) "Downlink Power Control for WiMAX Femtocell in IEEE 802.16m" ("J-Zhou"), by Jun Zhou, Andreas Maeder, Linghang Fan, Nader Zein, and Tetsu Ikeda, Technical Contribution to IEEE 802.16m, Oct. 30, 2008, available on-line at: http://wirelessman.org/tgm/contrib/C80216m-08_1244.pdf;

(d) "Interference Mitigation for Closed User Group Femtocells" ("Saperi"), by Luciano Sarperi and Yanling Lu, Technical Contribution to IEEE 802.16m, Oct. 31, 2008, available on-line at: http://wirelessman.org/tgm/contrib/C80216m-08_1315.doc;

(e) "Femtocell Interference Mitigation by Autonomously Adjusting Radio Resource Parameters" ("Morita"), by Motoki Morita, Nader Zein, Jun Zhou, Linghang Fan, and Tetsu Ikeda, Technical Contribution to IEEE 802.16m, Oct. 31, 2008. Available on-line at: http://wirelessman.org/tgm/contrib/C80216m-08_1254.pdf;

(f) "Interference Mitigation by Location-based Channel Allocation for Femtocell" ("Chen"), Whai-En Chen, Shiann-Tsong Sheu, Chih-Cheng Yang, Kanchei (Ken) Loa, Yung-Ting Lee, Chiu-Wen Chen, Chun-Yen Hsu, Youn-Tai Lee, Yi-Hsueh Tsai, Tsung-Yu Tsai, Chih-Shin Lin, Yang-Han Lee, and Yih Guang Jan, Technical Contribution to IEEE 802.16m, Oct. 31, 2008, available on-line at: http://wirelessman.org/tgm/contrib/C80216m-08_1319.ppt;

(g) "Interference mitigation in Femtocells" ("Zhang"), Kaibin Zhang, Gang Shen, and Jimin Liu, Technical Contribution to IEEE 802.16m, Oct. 31, 2008, available on-line at: http://wirelessman.org/tgm/contrib/C80216m-08_1427.ppt; and (h) "Self-coordinated femtocells to mitigate interference in IEEE 802.16m" ("Kone"), by Mamadou Kone, Ming-Hung Tao, Ying-Chuan Hsiao, and Richard Li, Technical Contribution to IEEE 802.16m, Nov. 6, 2008, available on-line at: http://wirelessman.org/tgm/contrib/C80216m-08_1421r1.ppt In Y-Zhou I, a femtocell base station (fBS) obtains initial measurements of the signal strengths and preamble indices of neighbor stations or access points with unique IDs, and indentifies the preamble index with the least received signal strength. This initial information, the highest number of mobile stations (MSs) connected to the fBS and their maximum traffic load are reported to an access server network gateway (ASN-GW) to facilitate a scheduling algorithm in the ASN-GW, which then allocates preamble indices and subchannels to the fBS. In other words, based on measurements reported by the fBSs, the ASN-GW minimizes interference by intelligent scheduling. Similarly, in Y-Thou II, an fBS periodically measure the signal strengths and preamble indices of neighboring base stations (BSs) or access points with unique IDs, and identifies the preamble index with the least received signal strength. The fBS periodically reports the measurements to the ASN-GW to facilitate a scheduling algorithm in the ASN-GW and to facilitate allocation of preamble indices and subchannels to the fBSs.

J-Zhou discloses a downlink close-loop power control scheme for femtocells. In the absence of downlink traffic, each MS connected to a femtocell BS periodically measures and records metrics of interference and received signal intensity for each subcarrier or each subchannel in which signals are expected to be received from the anchored fBS. When a downlink traffic channel is needed, the MS reports the recorded metrics to the fBS via an uplink control channel. Consequently, the fBS allocates power to each user according to QoS, loading, the value of received metric and the interference limitation. To reduce co-channel interference, a WiMAX fBS allocates only the necessary resources in the downlink for every active user.

Saperi discloses a system in which macrocell BSs (mBSs) under the network operator's control impose over the backbone scheduling restrictions (e.g., power control information or fractional frequency reuse (FFR) related information) on closed user group fBSs, so as to minimize interference between the macrocell and the femtocell.

In Morita, an fBS measures interference from surrounding macro or micro cells or neighboring femtocells in order to mitigate interference. Based on the measured surrounding reception power, the fBS selects an appropriate carrier frequency to avoid mutual interference between macro or micro cells and femtocells or among femtocells. Further, the femtocell sets a downlink (DL) maximum transmit power and an UL maximum allowed transmit power for camping MSs in such a way that to maximize the coverage of the femtocell, while keeping constant the interference impact to the surroundings.

Chen discloses using location information to mitigate interference among femtocells. In Chen's system, an operational channel of a femtocell is allocated based on both coarse location information obtained over an Internet connection (or, through another method, such as GPS), and operational channel information of neighboring femtocells.

Zhang discloses that an fBS and a femtocell MS (fMS) measure (initially and periodically) surrounding interference by scanning neighboring femtocells and the macro-cell. The fMS is also able to report its measurements to the fBS, so that interference mitigation techniques may be applied by both femtocell and macrocell users. However, Zhang provides no specific information as to how interference may be canceled.

Kone discloses an mBS that communicates with fBSs over the air and broadcasts a number of profiles selectable by the fBSs. These profiles correspond to the use of different part of DL/UL scenarios. An fBS can scan neighbor fBSs and the mBS to receive the available profiles, frequencies used and other measurement results. Using information derived from the scan, the fBS may decide either to use a different profile at the same frequency or choosing a different frequency with any available profile, so as to mitigate interference with adjacent fBSs.

SUMMARY

According to one embodiment of the present invention, co-channel operations are preferable for implementing femtocells, as such a system more efficiently utilizes the available spectrum and provides a mobile station a simpler cell search process. In one embodiment, processing gain is achieved in a femtocell network by taking advantage of a signaling format defined in the physical layer of the LTE standard and a time or frequency hopping mechanism. The present invention is motivated by the following common operational conditions observed at a femtocell: (a) the maximum load of a femtocell network is typically low, relative to the available bandwidth, and typically provided by only a few users (e.g., 4-6 users); (b) at any given time, the entire spectrum of a given femtocell network is likely to be occupied by only a single user or no users at all (e.g., during daytime, people are likely at work and away from home); and (c) in many situations, the spectrum is used only for voice connections, which do not require a large bandwidth, such as that required of multimedia type of applications.

Due to the above observations, a large portion of the spectrum assigned to a femtocell is idle. Such idle resources may be utilized in a femtocell by spreading the resource blocks of the users over the available spectrum. In one embodiment, spreading is achieved by repeating the transmission using a number of the resource block groups. As a result, (a) more robustness is obtained against interference; (b) transmission power levels may be decreased because of the spreading, resulting in reducing interference between nearby femtocells and between a macrocell and a femtocell.

The present invention is better understood upon consideration of the detailed description below, in conjunction with drawings.

DETAILED DESCRIPTION OF THE PREFERRED EMBODIMENTS

A femtocell network is vulnerable to both interference between it and a macrocell and between it and other femtocells. In general, assuming DL/UL synchronization between the macrocell and the femtocells, operations of the macrocell may interfere with operations in a femtocell as follows: (a) an mBS may interfere with an fMS during DL transmission; (b) an mMS may interfere with an fBS during UL transmission. Similarly, the operations of an fBS may interference with the operations in a macrocell: (a) an fBS may interfere with an mMS during DL transmission; (b) an fMS may interfere with an mBS during UL transmission. As between femtocells, (a) an fMS may interfere with a neighboring fBS during UL transmission; and (b) an fBS may interfere with a neighboring fMS during DL transmission. The present invention alleviates interference by lowering a femtocell's transmission power and spreading its transmission over the available spectrum resources. While this may cause a large amount of spectrum overlap, the reduced transmission power also reduces interference.

Figure 1:
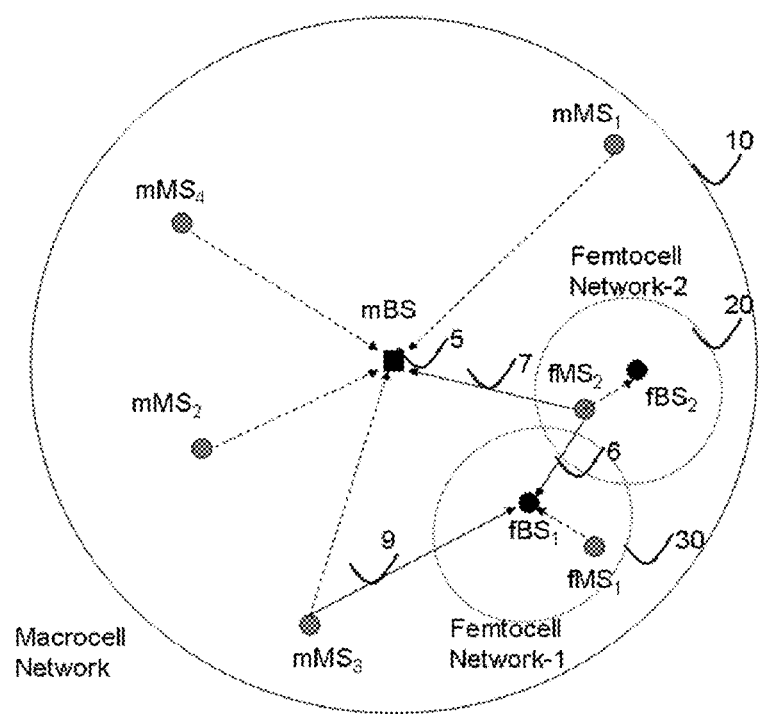
FIG. 1 shows a typical femtocell environment.

A typical femtocell environment is illustrated by FIG. 1. As shown in FIG. 1, femtocells 20 and 30, which coexist with macrocell 10, includes base stations $fBS_1$ and $fBS_2$ which communicate with their respective mobile stations $fMS_1$ and $fMS_2$. Macrocell 10 includes base station mBS 5 and a number of mobile stations $MS_1$ to $MS_4$. FIG. 1 also illustrates inter-femtocell interference 6, $mMS_3$ interfering with $fBS_1$ (i.e., interference 9) and $fMS_2$ interfering with mBS (interference 7).

Figure 2:
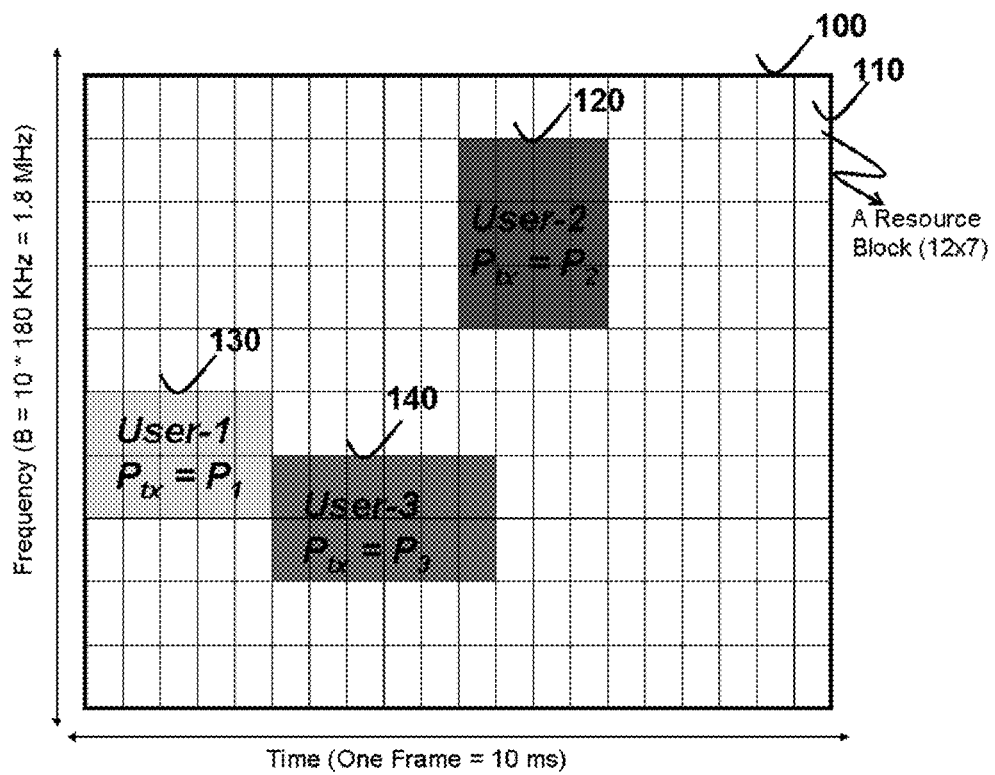
FIG. 2 shows a resource allocation scheme in an OFDMA system.
Figure 3:
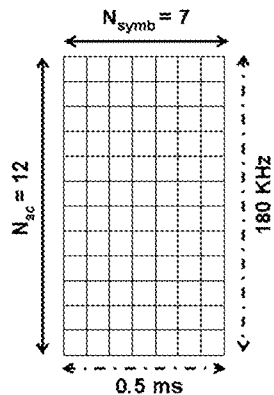
FIG. 3 shows, under the LTE standard, a resource block includes twelve (12) subcarriers within a 180 KHz bandwidth and 7 symbol intervals within 0.5 ms.

In this detailed description, the present invention is illustrated by embodiments which use a transmission scheme based on orthogonal frequency division multiple access (OFDMA), such as implemented under the LTE standard. FIG. 2 shows a resource allocation scheme typical of an OFDMA system under the LTE standard. As shown in FIG. 2, without loss of generality, a femtocell with three users (i.e., user-1, user-2 and user-3) is assigned a 1.8 MHz bandwidth. FIG. 2 shows the allocation of resources over a 10 ms frame. Under the LTE standard, as shown in FIG. 3, each resource block (e.g., resource block 110) includes twelve (12) subcarriers within a 180 KHz bandwidth and 7 symbol intervals within 0.5 ms for the more common resource allocation structure (other variations also exist). Since the number of users in a femtocell and their data rate requirements vary dynamically, a femtocell is designed to support a wide range of possible user and data traffic conditions. For example, a femtocell should support the maximum number of users (e.g., 4 users)

simultaneously accessing the system with bandwidth demanding connections. Note that the maximum number of users in a femtocell is considerably smaller than the number of users typically supported by a macrocell network. Accordingly, a femtocell should be able so support much larger data rates per user than the macrocell. Therefore, in a femtocell, when the number of users is small, or, if the data rates of the users are low (e.g., the user connections are all voice connections), a substantial portion of the femtocell's spectrum may remain idle. FIG. 2, for example, shows femtocell users user-1, user-2 and user-3 each being allocated a small number of resource blocks. In FIG. 2, user-2 is assigned a group of 12 resource blocks per frame (i.e., resource group 120). User-2 can achieve, assuming a 64-QAM modulation, a raw data rate of $12*(1/10^{-2})*(12*7)*6$, which is approximately 0.4 Mbps. Other resource allocations may be similarly provided.

Figure 4:
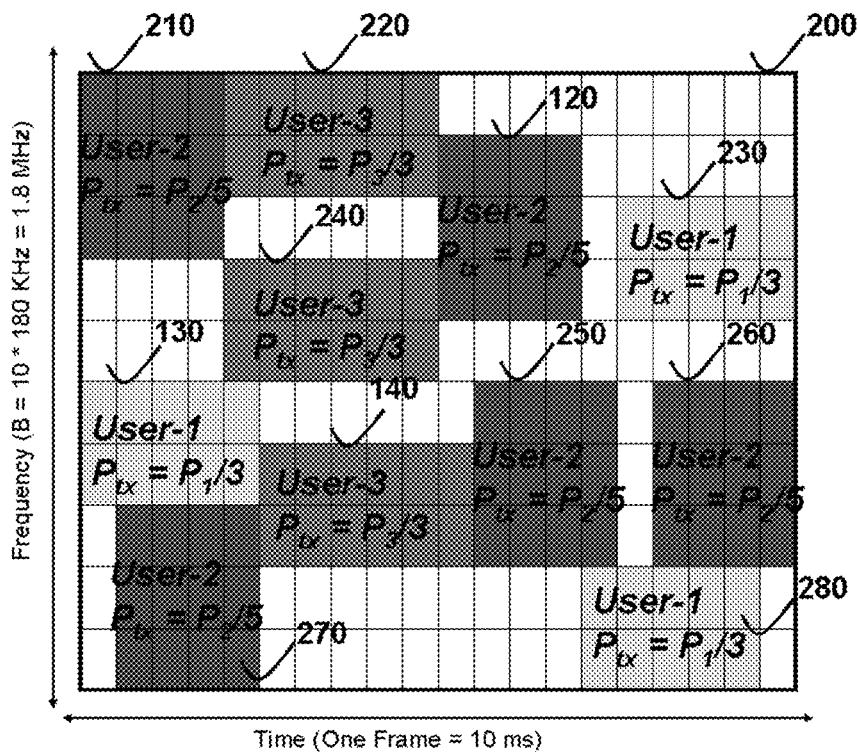
FIG. 4 illustrates using resource blocks in a femtocell's spectrum to apply spectrum spreading technique, according to one embodiment of the present invention.

In FIG. 2, a large number of resource blocks within the frame are idle. Such idle resource blocks in the femtocell's spectrum may be used for a spread spectrum technique, as illustrated in FIG. 4, according to one embodiment of the present invention. For example, in addition to resource block group 130, user-1 is additionally allocated resource block groups 230 and 280, thus allowing user-1 to spread its transmitted signal (e.g., repeated) in resource block groups 130, 230 and 280. At the receiver, the energy of the signals at resource block groups 130, 230 and 280 are combined prior to any symbol decision. Using this arrangement, user-1 need not transmit at the transmission power when only resource block group 130 is available. In one embodiment, transmitter power may be reduced according to the spreading factor N (e.g., N=3, for user-1). Similarly, as shown in FIG. 4, user-2 spreads its transmitted signal among resource block groups 120, 210, 250, 260, and 270 to achieve a spreading ratio of 5. Likewise, user-3 spreads its signal among resource blocks 140, 220, and 240 to achieve a spreading ratio of 3. All users thus may reduce their transmission powers according to their spreading ratios, respectively.

Transmission power reduction is important for reducing interferences between femtocell cells, and between a femtocell and a macrocell. In principle, nearby femtocells may utilize orthogonal resource allocations to minimize inter-femtocell interference. Such an arrangement, however, requires coordination among neighboring femtocells, which is burdensome. The spreading technique of the present invention reduces interference without requiring coordination among femtocells. A higher resource block utilization results from spreading the transmitted signals over a greater portion of the frame structure, at the cost of a greater probability of signal collisions in resource blocks between different femtocells. However, considering path loss and signal propagation characteristics in the channel (e.g., walls and obstructions in between different femtocells), the chance of interfering with an unintended receiver is reduced because of the concurrent reduction of transmission power. Under this arrangement, the receiver is still able to collect sufficient signal energy in the received signal after de-spreading. Spreading the resource blocks may be implemented together with one or more scheduling mechanisms (e.g., scheduling the resource block that has the best channel quality for a given user).

Figure 5:
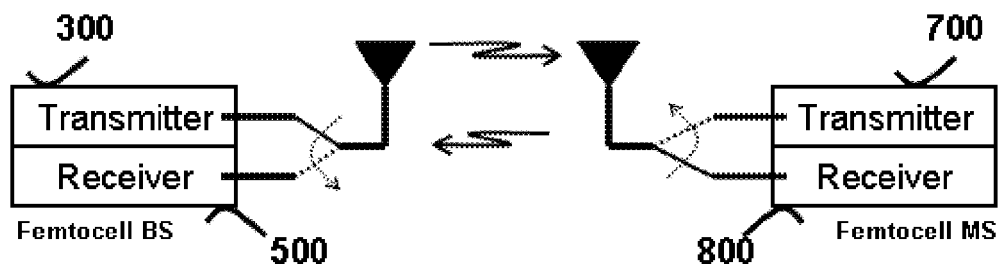
FIG. 5 illustrates a relationship between an fBS and an fMS in a femtocell.

FIG. 5 illustrates a relationship between a fBS and an fMS in a femtocell. As shown in FIG. 5, the fBS includes transmitter 300 and receiver 500. Similarly, the fMS includes transmitter 700 and receiver 800. As discussed below, the fBS makes scheduling and spreading decisions, which are communicated to the fMSs through control signaling so that the fMSs may accordingly demodulate the received signals.

Figure 6:
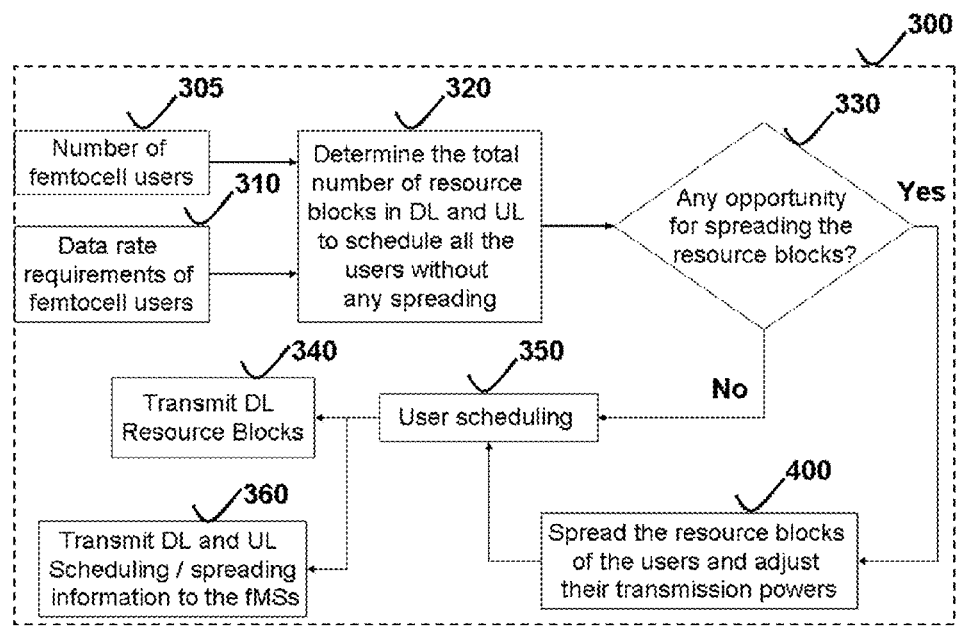
FIG. 6 is a block diagram which illustrates a spreading operation at the fBS, in conjunction with its operation of transmitter 300, according to one embodiment of the present invention.

FIG. 6 is a block diagram which illustrates a spreading operation at the fBS, in conjunction with its operation of transmitter 300 (i.e., downlink), according to one embodiment of the present invention. Initially, at steps 305 and 310, the number of users and their data rate requirements are obtained. Their quality of service requirements may also be used in lieu of or in conjunction with the data rate requirements. Then, at step 320, the number of resource blocks required to schedule all the users without any spreading, while fulfilling the quality of service requirements, is determined. At step 330, the femtocell's frequency spectrum is examined to identify opportunities for signal spreading in the unassigned resource blocks. If no such spreading opportunity is available, the resource blocks are assigned at step 350 to the users using a selected scheduling technique, and the signal for each user is transmitted at step 340. If there are unassigned resource blocks which may be used for spreading the signals to the users, at step 400, resource blocks are assigned to the users and the respective transmission powers to the users are scaled (e.g., by 1/N) according to the spreading ratio. Scheduling of transmission is carried out at step 350 and the signals are transmitted at step 340. Specific spreading information may be embedded within scheduling information messages sent at step 360 to the users in the conventional manner (e.g., scheduling messages under the LTE standard, or within DL-MAP and UL-MAP messages in WiMAX). According to the scheduling messages, the user fMSs despread the received resource blocks in the DL. Similarly, the users spread their UL signals as specified and scheduled by the fBS in the scheduling messages.

Figure 7:
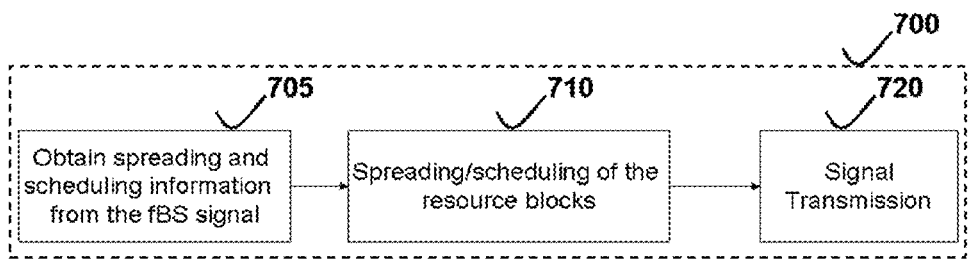
FIG. 7 is a block diagram which illustrates spreading operations at transmitter 700 of an fMS, according to one embodiment of the present invention.

FIG. 7 is a block diagram which illustrates spreading operations at transmitter 700 of an fMS, according to one embodiment of the present invention. As shown in FIG. 7, the fMS first obtains specific spreading and scheduling information at step 705 from a scheduling message transmitted by the fBS (e.g., a scheduling message sent at step 360 of FIG. 6). Then, at step 710, the fMS spreads and schedules its UL signals according to the spreading and scheduling information received. The uplink signals are transmitted at step 720.

Figure 8:
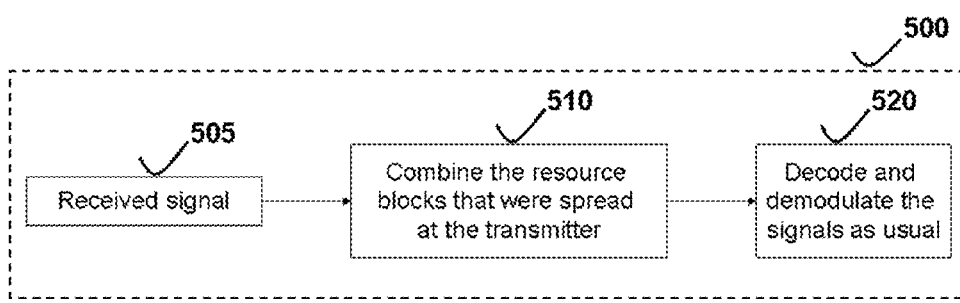
FIG. 8 is a block diagram which illustrates despreading at receiver 500 of an fBS, in accordance with one embodiment of the present invention.

FIG. 8 is a block diagram which illustrates despreading at receiver 500 of an fBS, in accordance with one embodiment of the present invention. After a signal is received by an fBS at step 505, the resource blocks of the corresponding user are combined at step 510. Combining may be achieved using one of several well-known techniques available in the literature, such as through maximum ratio combining (MRC) or equal gain combining (EGC) techniques. One example of a combining technique is disclosed in the article "RAKE reception with maximal-ratio and equal-gain combining for DS-CDMA systems in Nakagami fading," by M. S. Alouini, Sang Wu Kim, and A. Goldsmith, published in Proc. IEEE Int. Conf. on Universal Personal Commun., vol. 2, pp. 708-712, October 1997. Under the MRC approach, the energies of the received resource blocks are weighted by their signal-to-noise ratios (SNRs). Under the EGC approach, the energies in the resource blocks are combined without any weighting. After combining operation, the resource blocks are demodulated as in a conventional receiver, and symbol decisions are made at step 520.

Figure 9:
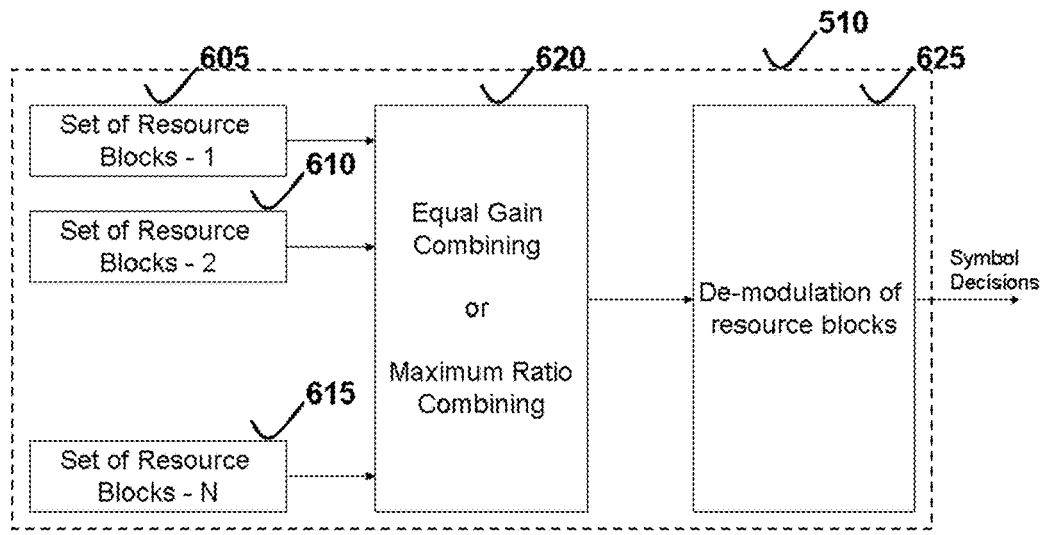
FIG. 9 is a block diagram which illustrates a method for combining resource blocks 510 that have been spread at a transmitter, in accordance with one embodiment of the present invention.

FIG. 9 is a block diagram which illustrates despreading at receiver 800 of an fMS, in accordance with one embodiment of the present invention. As shown in FIG. 9, at steps 605-615, the energies of the N resource blocks allocated to the fMS are collected according to the DL assigned schedule. At step 620, the energies of these received resource blocks are combined using, for example, the methods of combining discussed above with respect to receiver 500 of the fBS (e.g., the EGC and MRC methods). At step 625, the combined resource blocks are demodulated and decoded to recover the transmitted signal.

Figure 10:
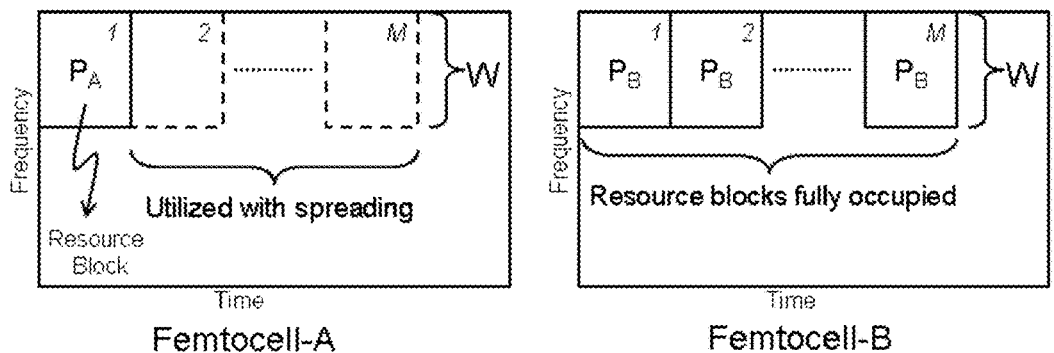
FIG. 10 shows two neighboring femtocell networks, i.e., underutilized Femtocell-A, a fully utilized Femtocell-B, and their respective resource allocations, in accordance with one embodiment of the present invention.
Figure 11:
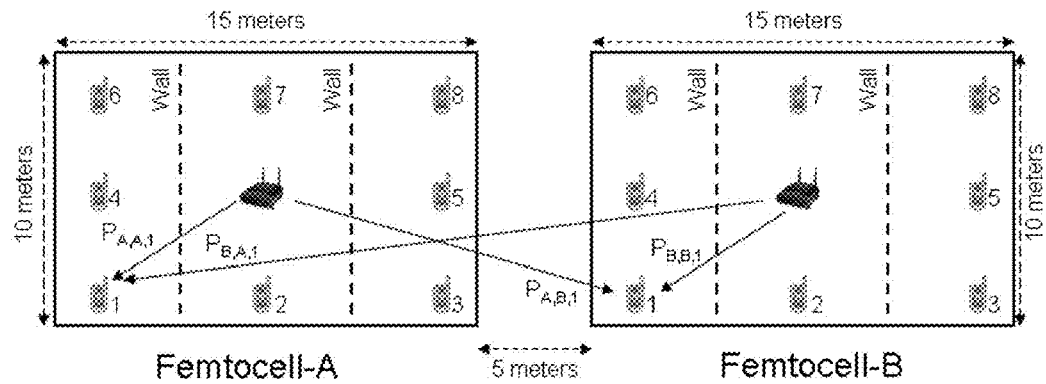
FIG. 11 provides one example of interference between Femtocell-A and Femtocell-B of FIG. 10.

FIG. 10 shows neighboring femtocell networks Femtocell-A and Femtocell-B and their respective resource allocations, in accordance with one embodiment of the present invention. FIG. 11 provides one example of interference between Femtocell-A and Femtocell-B of FIG. 10. In FIG. 11, variable $P_{i,j,k}$ represents the received signal power from Femtocell-i at user k of Femtocell-j. As shown in FIG. 10, the resource blocks in Femtocell-B are assumed fully utilized by its users, while the spectrum assigned to Femtocell-A is assumed under-utilized, so that there are several unused resource blocks in the spectrum of Femtocell-A. Also, it is assumed that the impacts of path loss and fading are the same over all the resource blocks.

In the following, an example case study for analyzing the impact of the spreading factor used by Femtocell-A on the capacity of the two femtocell networks is presented in order to examine gains resulting from a spreading operation at an under-utilized femtocell. In this detailed description, "spreading over m resource blocks" means that data assigned to a single resource block is transmitted over m resource blocks. The spreading may be distributed over both time and frequency dimensions, while the transmission power may be scaled by 1/m. First, consider that the femtocell base station (fBS)-A of Femtocell-A transmits to its femtocell MSs (fMSs) without any spreading. Then, the capacity of Femtocell-B can be written as follows $$C_B^{(ns)} = W\log\left(1 + \frac{P_{B,B}}{P_{A,B} + WN_0}\right) + (M-1)W\log\left(1 + \frac{P_{B,B}}{WN_0}\right), \quad (1)$$

where the superscript (ns) indicates the non-spreading assumption, M is the total number of resource blocks over which the capacity is calculated, $P_{B,B}$ is the received power from fBS-B by a user in Femtocell-B, $P_{A,B}$ is the received power from fBS-A by a user in Femtocell-B, W is the bandwidth associated with a certain resource block, and $N_0$ is the noise spectral density. In a similar way, capacity of Femtocell-A without any spreading can be written as $$C_A^{(ns)} = W\log\left(1 + \frac{P_{A,A}}{P_{B,A} + WN_0}\right), \quad (2)$$

where $P_{A,A}$ is the received power from fBS-A by a user in Femtocell-A.

Next, fBS-A spreads its resource blocks over m resource blocks, such as shown in FIG. 1 (where $1 < m \leq M$) and scales its transmission power accordingly. In this example, the capacity of Femtocell-B may be written as $$C_B^{(s)} = mW\log\left(1 + \frac{P_{B,B}}{\frac{P_{A,B}}{m} + WN_0}\right) + (M-m)W\log\left(1 + \frac{P_{B,B}}{WN_0}\right), \quad (3)$$

where the superscript (s) refers to the spreading assumption. In a similar manner, the capacity of Femtocell-A may be written as $$C_A^{(s)} = mW\log\left(1 + \frac{P_{A,A}/m}{P_{B,A} + WN_0}\right). \quad (4)$$

Note that for m=1, equation (4) reduces to equation (2), and equation (3) reduces to equation (1). In order to evaluate the impact of spreading on the capacities of the two femtocell networks, the derivatives of the capacities in equations (3) and (4) are taken. First, let's consider how the capacity of the fully-utilized network changes with m. Equation (3) may be rewritten as:

$$C_B^{(s)} = W\log\left[\underbrace{\left(1 + \frac{mP_{B,B}}{P_{A,B} + mWN_0}\right)^m}_{f_1} + \underbrace{\left(1 + \frac{P_{B,B}}{WN_0}\right)^{M-m}}_{f_2}\right] \quad (5)$$

Defining $f_1$ and $f_2$ as the values indicated above the derivative of function $f = f_1^m f_2^{M-m}$ with respect to m may be written as:

$$\frac{df}{dm} = f_1^m \frac{df_2^{M-m}}{dm} + \frac{df_1^m}{dm} f_2^{M-m} = f_2^{M-m}\left(\frac{df_1^m}{dm} - f_1^m \ln f_2\right) \quad (6)$$

where $$\frac{df_1^m}{dm} = mf_1^{m-1}\frac{P_{A,B}P_{B,B}}{(P_{A,B} + WN_0 m)^2} + f_1^m \ln f_1, \quad (7)$$

from which equation (6) can be re-written as $$\frac{df}{dm} = f_2^{M-m} f_1^{m-1}\left(\frac{mP_{A,B}P_{B,B}}{(P_{A,B} + WN_0 m)^2} + f_1 \ln \frac{f_1}{f_2}\right). \quad (8)$$

While $f_1$ and $f_2$ are positive numbers, the term within the parentheses of equation (8) may be positive or negative, depending on whether the system is interference-limited (i.e., noise terms are negligible) or noise-limited (i.e., interference terms are negligible). In the interference limited scenario (i.e., $P_{A,B} \gg WN_0$), equation (8) may be approximated by:

$$\frac{df}{dm} \approx f_2^{M-m} f_1^{m-1}\left[\frac{mP_{B,B}}{P_{A,B}} + \left(1 + \frac{mP_{B,B}}{P_{A,B}}\right)\ln\frac{f_1}{f_2}\right]. \quad (9)$$

Each side of equation (9) is negative if $$\ln\frac{f_1}{f_2} < -\frac{mP_{B,B}}{P_{A,B} + mP_{B,B}}. \quad (10)$$

When $P_{A,B} > 0$, $-1 < -mP_{B,B}/(P_{A,B} + mP_{B,B}) < 0$. Moreover, in an interference limited scenario, $f_1 \ll f_2$. Therefore, the condition of inequality (10) is satisfied, and hence, the capacity of the fully-utilized femtocell is a decreasing function of the spreading factor m for an interference-limited scenario. Conversely, for a noise-limited scenario (i.e., $P_{A,B} \ll WN_0$), the derivative of function $f$ becomes $$\frac{df}{dm} \approx f_2^{M-m} f_1^{m-1}\left[\frac{P_{A,B}P_{B,B}}{m(WN_0)^2} + \left(1 + \frac{P_{B,B}}{WN_0}\right)\ln 1\right]. \quad (11)$$

which is positive. The positive value implies that the capacity of the fully-utilized Femtocell-B is an increasing function of the spreading factor m for a noise-limited scenario. If $P_{A,B}$ is comparable to the noise power, the capacity of Femtocell-B may be a decreasing or increasing function of m for different values of m. In a similar way, the capacity $C_A^{(s)}$ of Femtocell-A with respect to m can be evaluated through its derivative with respect to m. We may re-write equation (4) as $$C_A^{(s)} = W \log\left(1 + \underbrace{\frac{1}{m}\frac{P_{A,A}}{P_{B,A} + WN_0}}_{g_1}\right)^m. \tag{12}$$

Taking the derivative of $g=g_1^m$ with respect to m, we have $$\frac{dg}{dm} = mg_1^{m-1}\frac{dg_1}{dm} + g_1^m \ln g_1 = g_1^{m-1}(1 + g_1(\ln g_1 - 1)). \tag{13}$$

For $m \geq 1$, the derivative of g in equation (13) is non-negative. Therefore, the capacity of an under-utilized femtocell is always an increasing function of m.

From equation (13), the capacity of an underutilized network always benefits from spreading. However, equation (8) implies that the capacity of a fully-utilized network may be impacted positively or negatively from spreading by a neighboring underutilized network, depending on the severity of the observed interference with respect to the noise power. In fact, as is discussed in the following, the capacity gain of Femtocell-A is more pronounced in a scenario where Femtocell-B's capacity is degraded.

Next, rate-constrained resource allocation at the under-utilized femtocell network is discussed. When a user in Femtocell-A has a rate requirement that is lower than the channel capacity, there is no reason for using a transmission power and a spreading factor that cause severe interference with a neighboring femtocell network. From equation (4) and for a given spreading factor $\tilde{m}$, the required received power $\tilde{P}_{A,A}$ in order to fulfill data rate requirement R for a user in Femtocell-A can be written as $$\tilde{P}_{A,A} = \tilde{m}(P_{B,A} + WN_0)(2^{R/\tilde{m}W} - 1), \tag{14}$$

Equation (14) shows that different combinations of $(\tilde{P}_{A,A}, \tilde{m})$ satisfy the same rate R. On the other hand, different combinations of $(\tilde{P}_{A,A}, \tilde{m})$ will have different impacts on the capacity of Femtocell-B. Substituting equation (14) into equation (3), the capacity of the fully utilized Femtocell-B can be written as $$C_B^{(s)} = \tilde{m}W\log\left(1 + \frac{P_{B,B}}{\alpha_{A,B}(P_{B,A} + WN_0)(2^{R/\tilde{m}W} - 1) + WN_0}\right) + \tag{15}$$

$$(M - \tilde{m})B\log\left(1 + \frac{P_{B,B}}{WN_0}\right),$$

where $\alpha_{A,B} = \tilde{P}_{A,B}/\tilde{P}_{A,A}$ is a scaling factor that characterizes the path loss from Femtocell-A to Femtocell-B, which can also be expressed in decibels as $PL_{A,B} \triangleq 10 \log_{10} \alpha_{A,B}$. Within the constraint of rate requirement R, Femtocell-A may choose any legitimate combination of $(\tilde{P}_{A,A}, \tilde{m})$, so that it interferes least with neighboring femtocell network Femtocell-B.

Simulations have been made to compare the capacities of Femtocell-A and Femtocell-B for different signal-to-interference ratio (SIR), interference-to-noise ratio (INR), and spreading factor (m) values. SIR is the ratio of the desired signal power to the interfered signal power, INR is the ratio of the interferer power to the noise power within a given bandwidth. While setting the SIR and the INR, the interferer power is set to 1, and the desired signal power and noise power are adjusted accordingly. The resource block bandwidth is taken as, for example, W=180 KHz (as used in the Long Term Evolution (LTE) standard), noise power is set to $N_0$=−174 dBm/Hz, and the maximum value of the spreading factor is set to M=100.

A. Impact of Spreading Factor on the Capacity

Figure 12:
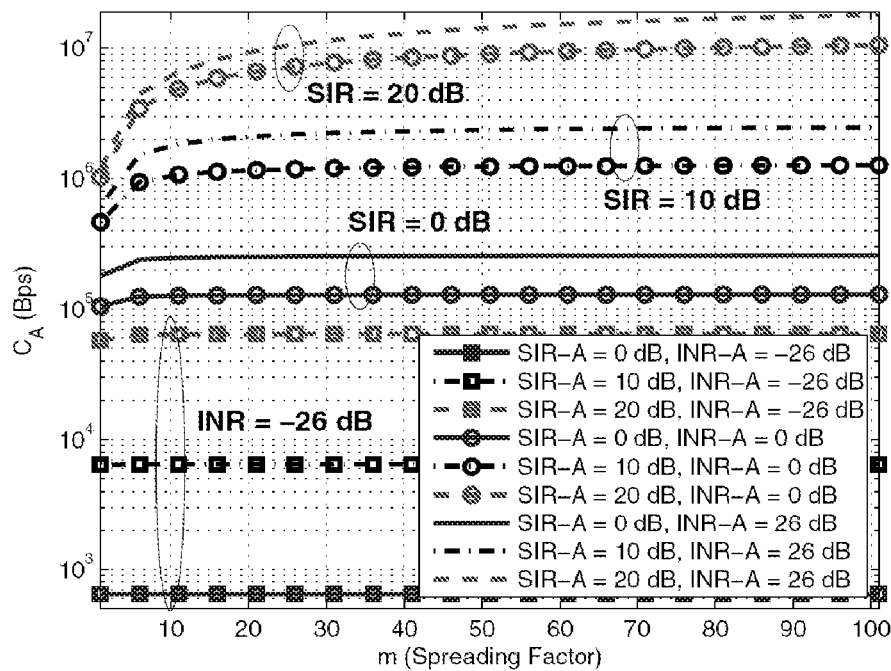
FIG. 12 shows simulation results of the capacity of underutilized femtocell network Femtocell-A, with respect to the spreading factor m.
Figure 13:
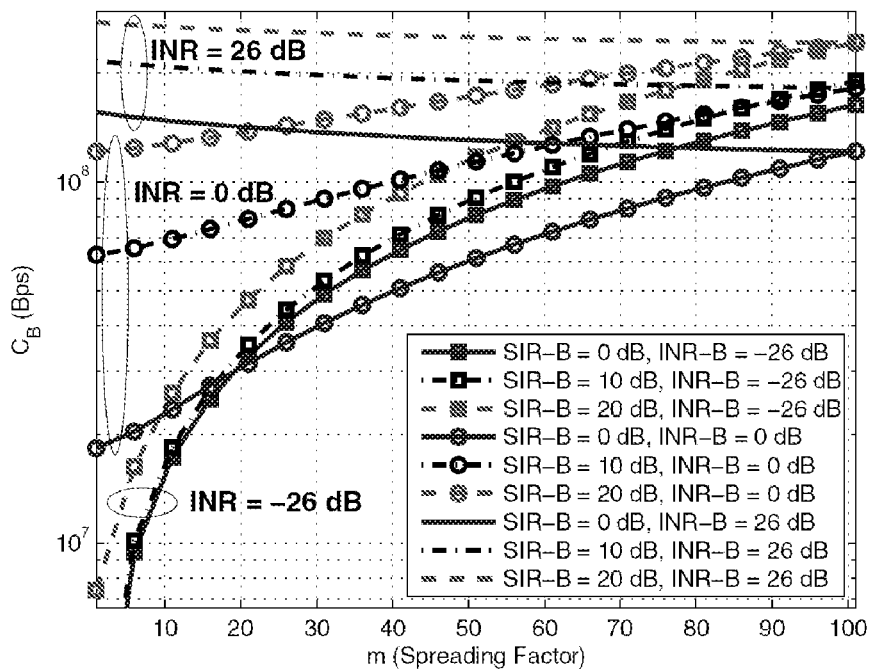
FIG. 13 shows simulation results of the capacity results of fully utilized femtocell network Femtocell-B, with respect to the spreading factor m.

The capacity results for the under-utilized and the fully utilized femtocell networks Femtocell-A and Femtocell-B with respect to the spreading factor m are given in FIG. 12 and FIG. 13, respectively. FIG. 12 confirms equation (13), which shows that the capacity of under-utilized femtocell network Femtocell-A is an increasing function of the spreading factor. The improvement in the channel capacity is particularly significant for larger SIR and INR values, and for relatively smaller spreading factors. Similarly, FIG. 13 confirms that the capacity of the fully-utilized network Femtocell-B is consistent with the relationships discussed above in conjunction with equations (5)-(11). In an interference limited environment (e.g., INR=26 dB), the capacity of Femtocell-B is a decreasing function of the spreading factor m (see, e.g., equation (9) above). On the other hand, in a noise limited scenario (e.g., INR=−26 dB), the channel capacity improves with the spreading factor, as also implied by equation (11).

For under-utilized femtocell Femtocell-A, improvement in capacity is insignificant in a noise-limited environment, while the improvement is more pronounced in an interference-limited environment.

B. Rate-Constrained Resource Allocation

Figure 14:
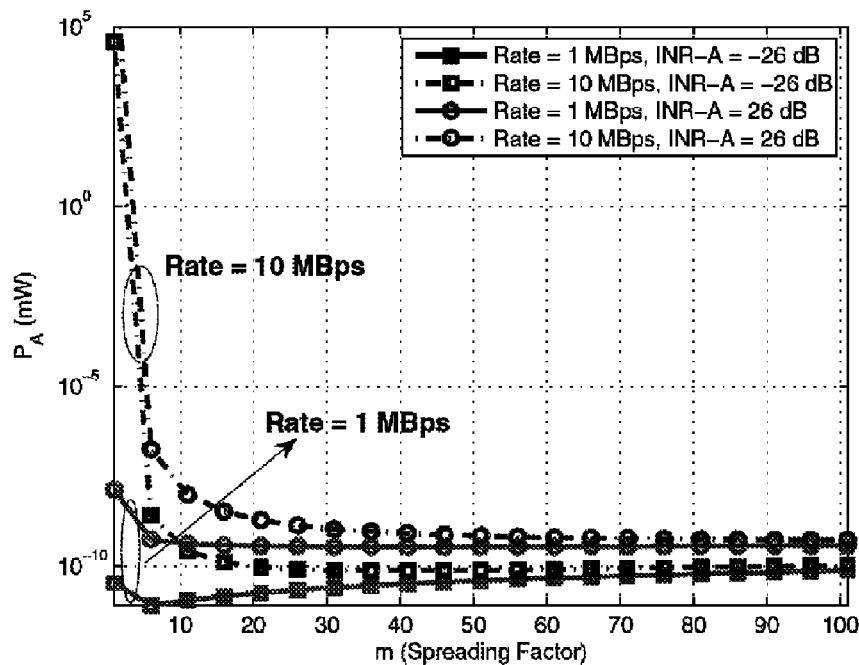
FIG. 14 shows simulation results of the required received power levels at Femtocell-A that achieve a given data rate for different spreading factors m.
Figure 15:
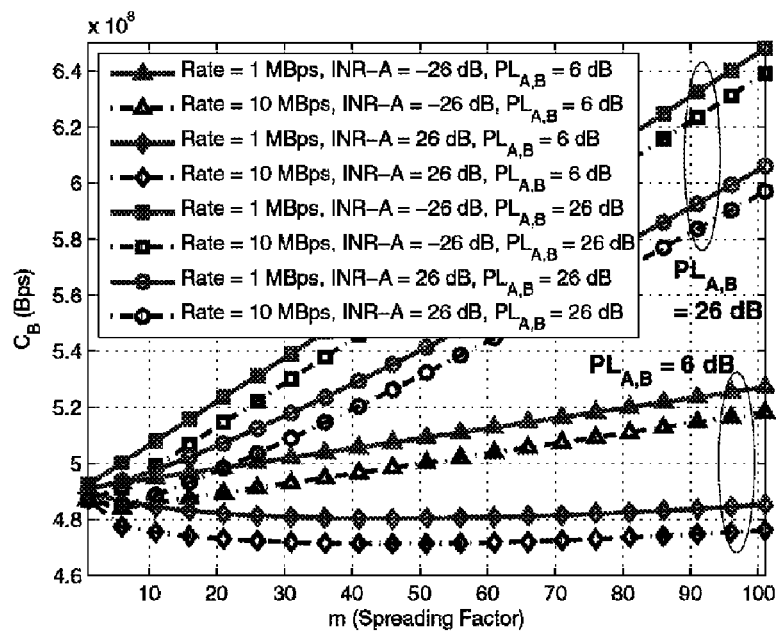
FIG. 15 shows simulation results of the capacity of Femtocell-B for different spreading factors m in Femtocell-A

As long as the desired data rate can be achieved, Femtocell-A may employ any legitimate combination of its transmission power and spreading factor. Assume, for example, that Femtocell-A is occupied by user(s) with low data rate requirements (e.g., 1 MBps and 10 Mbps), while Femtocell-B is fully occupied (i.e., utilizes all of the M=100 resource blocks). The INR values of −26 dB and 26 dB are assumed for Femtocell-A. The interference from Femtocell-B is obtained using the noise power per given bandwidth and the INR. Also, the scaling coefficient in equation (15) is set in decibels as $PL_{A,B}$=6 dB and 26 dB. FIG. 14 shows simulation results of the required received power levels at Femtocell-A that achieve a given data rate for different spreading factors m. FIG. 14 shows that the desired signal power is a decreasing function of m for small m, but may become an increasing function for larger m values. FIG. 15 shows simulation results of the capacity of Femtocell-B for different spreading factors m in Femtocell-A. For large INR values in Femtocell-A, the fBS-A sets a larger transmission power to achieve the desired rate, and hence increases its interference with Femtocell-B, thus decreasing the capacity of Femtocell-B (e.g., for INR-A=26 dB and $PL_{A,B}$=6 dB). On the other hand, the capacity of fully-utilized femtocell network Femtocell-B is an increasing function of spreading factor m for smaller INR and larger path-loss values.

C. Capacity Results in a Practical Scenario

FIG. 11 illustrates rate-constrained resource allocation in a practical femtocell environment In FIG. 11, each femtocell network includes 8 different MS locations Femtocell-A and Femtocell-B represent, for example, networks implemented in apartments each having a size of 10×15 meters, with 5 meter separation in between them. The indoor path loss model may be based, for example, on a modified version of the Keenan-Motley model and is given by equation (15) with PL(dB)=38.46+20 log 10 d+qW (16) where the distance between the transmitter and the receiver is denoted by d (in meters), W=5 dB is taken as a fixed wall partition loss (i.e., assuming the same loss for both indoor and outdoor walls), and q is the number of walls between the transmitter and the receiver (i.e., assuming no inter-floor propagation). Transmission power $P_B$ of fBS-B is set to 13 dBm, while the transmission power $P_A$ of fBS-A is varied as in equation (14) in order to fulfill the data rate requirement for a given user in Femtocell-A.

Figure 16:
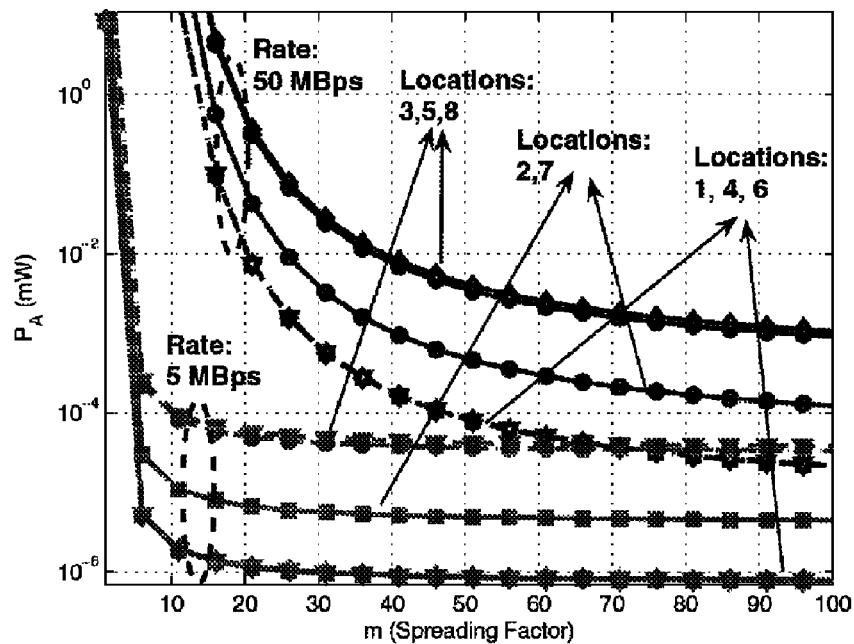
FIG. 16 shows the simulated required received powers for different locations of the MSs in Femtocell-A, for required data rates R=5 MBps and R=50 MBps.

FIG. 16 shows the, required received powers for different locations of the MSs in Femtocell-A, for required data rates R=5 MBps and R=50 MBps. As shown in FIG. 16, a higher received power is required for a higher data rate. Moreover, the users closer to the neighboring femtocell (e.g., at locations 3, 5, 8) require greater received powers due to interference from the other femtocell, while the users further away to the neighboring femtocell (e.g., at locations 1, 4, 6) have lower received power requirements. Due to the symmetry of the interference observed, the users at similar distances to fBS-B have similar received power requirements.

Figure 17:
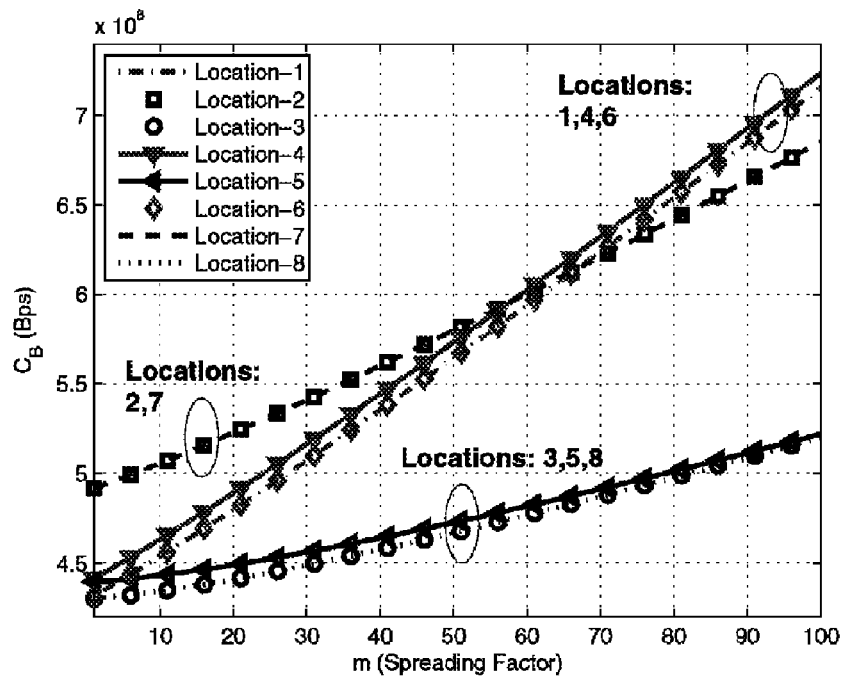
FIG. 17 shows the simulated capacities of users at eight different MS locations in Femtocell-B for required data rate R=5 MBps in Femtocell-A.
Figure 18:
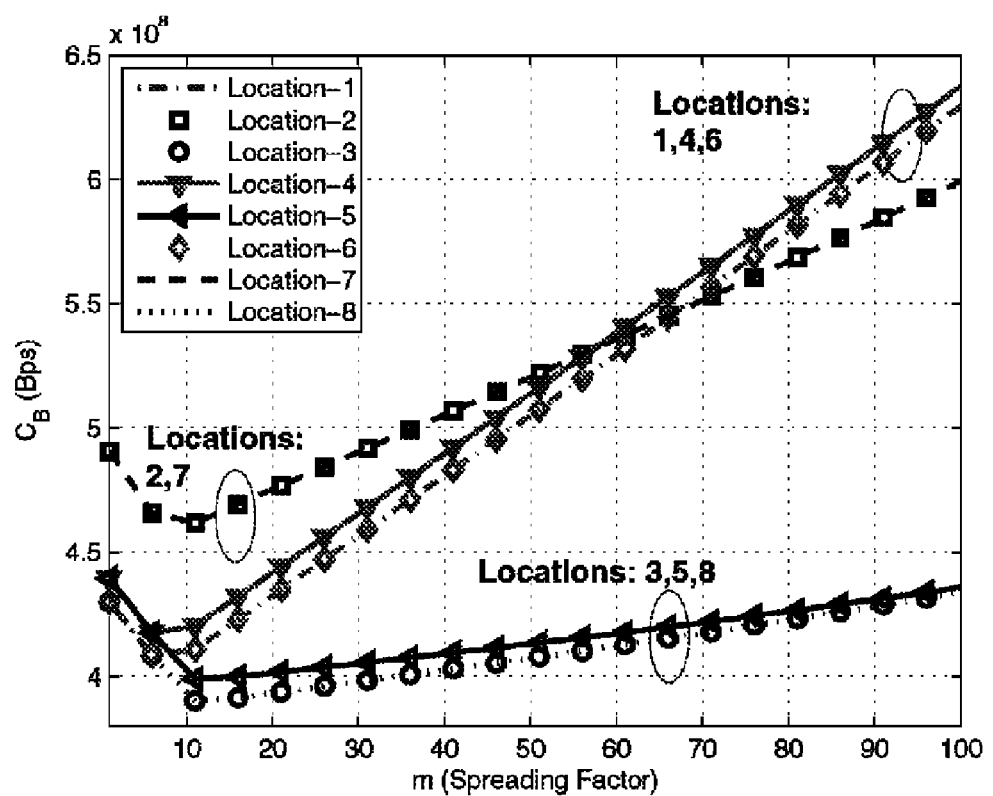
FIG. 18 shows the simulated capacities of users at eight different MS locations in Femtocell-B for required data rate R=50 MBps in Femtocell-A.

FIG. 17 and FIG. 18 show the simulated capacities of users at eight different MS locations in Femtocell-B for required data rates R=5 MBps and R=5° MBps in Femtocell-A, respectively. For each MS location k in Femtocell-B, the interference from Femtocell-A is assumed due to communication between fBS-A and MS-k in Femtocell-A. The results in FIG. 17 show that for a rate requirement of 5 MBps, spreading improves the capacity of the MSs at all of the 8 possible different locations in Femtocell-B. Due to the symmetry of the interference, the MSs at similar distances to fBS-A observe similar capacities. Even though they are far away to fBS-A, the MSs at locations 3, 5, 8 observe the lowest capacity. This is basically due to the specific simulation settings, where, as discussed above, the transmission power of fBS-A is the strongest to the MSs 3, 5, 8 in its own network. This results implies that the interference is strongest for the MSs 3, 5, 8 at Femtocell-B.

FIG. 18 shows that, when the Femtocell-A rate constraint is raised to 50 MBps, the simulated Femtocell-B capacity degrades (as compared to 5 MBps rate constraint in FIG. 17) due to the higher transmission power of fBS-A. Moreover, spreading in Femtocell-A reduces the capacity of Femtocell-B for low spreading factors m, while increasing the capacity of Femtocell-B for sufficiently large spreading factors m. In summary, FIGS. 5, 8, and 9 show that it is typically desirable for an under-utilized femtocell to spread its transmission in order to minimize its interference with neighboring fully-utilized femtocells.

The above detailed description is provided to illustrate the specific embodiments of the present invention and is not intended to be limiting. Numerous variations and modification within the scope of the present invention are possible. For example, rather than using repetition of the resource blocks, as discussed above, additional coding mechanisms may be incorporated into the framework. Further, time/frequency hopping sequences (e.g., those used in frequency-hopping systems) may be used, while spreading techniques are applied to the resource blocks. Such spreading sequences have minimal cross-correlation characteristics (see, e.g., frequency hopping codes). Examples of frequency hopping codes are disclosed, for example, in (a) the article "A class of frequency hop codes with nearly ideal characteristics for use in multiple-access spread-spectrum communications and radar and sonar systems," by S. V. Maric and E. L. Titlebaum, published in IEEE Trans. Commun., vol. 40, no. 9, pp. 1442-1447, September 1992; (b) the article "Frequency hop multiple access codes based upon the theory of cubic congruences," by S. V. Maric and E. L. Titlebaum, published in IEEE Trans. Aerospace Electron. Syst., vol. 26, no. 6, pp. 1035-1039, November 1990; and (c) the article "A new family of frequency-hop codes," by O. Moreno and S. V. Maric, published in the IEEE Trans. Commun., vol. 48, no. 8, pp. 1241-1244, August 2000. Frequency hopping codes reduces the number of hits between resource blocks of different femtocells (or, between the a femtocell and the macrocell), thus resulting in a minimum inter-cell interference. The present invention is set forth in the accompanying claims,

I claim:

1. In a base station for a femtocell network which includes a plurality of mobile stations, a method comprising:
   determining the number of mobile stations in the femtocell network and their respective resource requirements and first transmission powers in each data frame;
   based on the number of mobile stations and their respective communication resource requirements, determining additional communication resources that are available in the data frame after satisfying the resource requirements;
   allocating to each mobile station its communication resource requirement and a portion of the additional communication resources; and
   communicating with each mobile station using a protocol which spreads signal energy over the communication resources allocated to that mobile station and wherein the communication is performed according to a second transmission power that is lower than the first transmission power.

2. A method as in claim 1, wherein the data frame comprises a downlink data frame.

3. A method as in claim 1, wherein the data frame comprises an uplink data frame.

4. A method as in claim 1, wherein the communication resources comprises OFDMA resource blocks.

5. A method as in claim 1, further comprising, in a receiver of the communicating between the base station and one of the mobile stations, despreading the received signal from the allocated communication resources corresponding to that mobile station.

6. A method as in claim 5, wherein the despreading uses an equal gain combining method.

7. A method as in claim 5, wherein the despreading uses a maximum ratio combining method.

8. A method as in claim 5, further comprising demodulating the despreaded signal.

9. A method as in claim 1, further comprising:
   scheduling communication in the data frame based on the allocated communication resources to the mobile stations; and
   communicating the scheduling to the mobile stations.

10. A method as in claim 9, wherein a receiver in the communicating between the base station and one of the mobile stations despreads the received data from the allocated communication resources corresponding to that mobile station according to the scheduling.

11. A method as in claim 1, wherein the communicating with each mobile station using a protocol which spreads signal energy over the communication resources comprises repeating the data in the portion of additional communication resources allocated to the communicating mobile station.

12. A method as in claim 1, wherein additional channel coding is applied to the portion of additional communication resources allocated to the communicating mobile station.

13. A method as in claim 1, wherein the allocation is carried out based on spreading sequences having a cross-correlation property that reduces interference.

14. A method as in claim 13, wherein the interference comprises interference between the base station and one or more of the mobile stations.

15. A method as in claim 13, wherein the interference comprises interference among mobile stations.

16. A method as in claim 1, wherein the femtocell network is located within a service area of a macrocell network.

17. A method as in claim 1, wherein the communicating is conducted using a transmission power that is scaled with a spreading ratio applicable to the allocated communication resources.

18. A method as in claim 1, wherein the femtocell is an underutilized femtocell and wherein the base station chooses a combination of transmit power and spreading factor to achieve a desired data rate.

19. A method as in claim 18, where the combination of transmit power and spreading factor minimizes the interference at a neighboring femtocell.

20. A base station in a femtocell network which includes a plurality of mobile stations, comprising:
a computation resource which performs:
determining the number of mobile stations in the femtocell network and their respective resource requirements and first transmission powers in each data frame;
based on the number of mobile stations and their respective communication resource requirements, determining additional communication resources that are available in the data frame after satisfying the resource requirements; and
allocating to each mobile station its communication resource requirement and a portion of the additional communication resources and a second transmission power that is lower than the first transmission power; and
a communication resource which communicates with each mobile station using a protocol which spreads signal energy over the communication resources allocated to that mobile station according to the second transmission power.

21. A base station as in claim 20, wherein the data frame comprises a downlink data frame.

22. A base station as in claim 20, wherein the data frame comprises an uplink data frame, 23. A base station as in claim 20, wherein the communication resources comprises OFDMA resource blocks.

24. A base station as in claim 20, wherein the receiver of the communicating between the base station and one of the mobile stations despreads the received signal from the allocated communication resources corresponding to that mobile station.

25. A base station as in claim 24, wherein the received signal is despreaded using an equal gain combining method.

26. A base station as in claim 24, wherein the received signal is despreaded using a maximum ratio combining method.

27. A base station as in claim 20, wherein the computation resource further performs:
scheduling communication in the data frame based on the allocated communication resources to the mobile stations; and
communicating the scheduling to the mobile stations.

28. A base station as in claim 20, wherein the communicating is conducted using a transmission power that is scaled with a spreading ratio applicable to the allocated communication resources.

29. A mobile station in a femtocell network which includes a base station, comprising:
a receiver for receiving from an allocation of communication resources in a data frame for communicating between the base station and the mobile station and a scheduling for the communicating; and
a communication resource that carries out the communicating between the mobile station and the base station using a protocol which spreads signal energy over the communication resources allocated to the mobile station, wherein the communicating is conducted using a transmission power that is scaled with a spreading ratio applicable to the allocated communication resources.

30. A mobile station as in claim 29, wherein the data frame comprises a downlink data frame.

31. A mobile station as in claim 29, wherein the data frame comprises an uplink data frame.

32. A mobile station as in claim 29, wherein the communication resources comprises OFDMA resource blocks.

33. A mobile station as in claim 29, wherein the receiver of the communicating between the base station and the mobile station despreads the received signal from the allocated communication resources.

34. A mobile station as in claim 33, wherein the received signal is despreaded using an equal gain combining method.

35. A mobile station as in claim 33, wherein the received signal is despreaded using a maximum ratio combining method.

* * * * *